United States Patent
Pape et al.

(10) Patent No.: US 7,150,679 B2
(45) Date of Patent: Dec. 19, 2006

(54) VIBRATION-DECOUPLED PULLEY HAVING AN INTEGRATED VISCO DAMPER

(75) Inventors: Rolf Pape, Berlin (DE); Joerg Sandig, Berlin (DE); Klaus Kern, Neuenburg (DE); Peter Barsch, deceased, late of Auggen (DE); by Hanna-Elfriede Barsch, legal representative, Auggen (DE)

(73) Assignee: Carl Freudenberg KG (DE)

( * ) Notice: Subject to any disclaimer, the term of this patent is extended or adjusted under 35 U.S.C. 154(b) by 287 days.

(21) Appl. No.: 10/239,486

(22) PCT Filed: Jan. 24, 2001

(86) PCT No.: PCT/EP01/00724

§ 371 (c)(1),
(2), (4) Date: Dec. 9, 2002

(87) PCT Pub. No.: WO01/71219

PCT Pub. Date: Sep. 27, 2001

(65) Prior Publication Data

US 2004/0116191 A1    Jun. 17, 2004

(30) Foreign Application Priority Data

Mar. 21, 2000  (DE) .............................. 100 13 699

(51) Int. Cl.
*F16D 3/76* (2006.01)

(52) U.S. Cl. ...................... 464/17; 464/89; 464/180; 474/94; 474/902

(58) Field of Classification Search ............ 464/89–91, 464/180, 17; 74/573 F, 574; 474/94, 902, 474/903; 188/378
See application file for complete search history.

(56) References Cited

U.S. PATENT DOCUMENTS

| | | | | |
|---|---|---|---|---|
| 2,514,139 A | * | 7/1950 | O'Connor | 74/574 |
| 2,724,983 A | * | 11/1955 | O'Connor | 74/574 |
| 5,140,868 A | * | 8/1992 | Mizuno et al. | 74/574 |
| 5,441,456 A | * | 8/1995 | Watanabe et al. | 474/94 |
| 5,527,227 A | * | 6/1996 | Asai et al. | |
| 5,637,041 A | | 6/1997 | Hamaekers et al. | |
| 5,988,015 A | * | 11/1999 | Riu | 74/574 |
| 6,026,709 A | * | 2/2000 | Depp et al. | 74/573 F |

FOREIGN PATENT DOCUMENTS

| | | |
|---|---|---|
| DE | 3516104 | 11/1986 |
| DE | 3731041 | 3/1989 |

(Continued)

*Primary Examiner*—Greg Binda
(74) *Attorney, Agent, or Firm*—Harness, Dickey & Pierce, P.L.C.

(57) ABSTRACT

A pulley (1) that is decoupled from the vibrations of a crankshaft and that has an integrated viscous torsional vibration damper (2), including a flywheel (3), which is arranged in a damper housing (5) that is filled with a viscous medium (4) and which can rotate relative to the housing, as well as a bearing (6) and a coupling (7) made of rubber elastic material, for supporting the pulley (1) with respect to the damper housing (5) in a flexible manner in the circumferential direction of the pulley and so as to be capable of relative rotation, the pulley (1) being assigned to the flywheel (3) so as to be axially adjoining. The damper housing (5) has at least one first axial projection (8), which is enclosed by the belt-bearing surface (9) of the pulley (1) at a radial clearance, and the bearing (6) is arranged in the gap (10) that is formed by the clearance.

20 Claims, 1 Drawing Sheet

FOREIGN PATENT DOCUMENTS

| | | | |
|---|---|---|---|
| DE | 004018596 A1 * | 12/1991 | ............... 464/90 |
| DE | 19506454 | 5/1996 | |
| DE | 19708082 | 9/1998 | |
| FR | 2771791 | 6/1999 | |

* cited by examiner

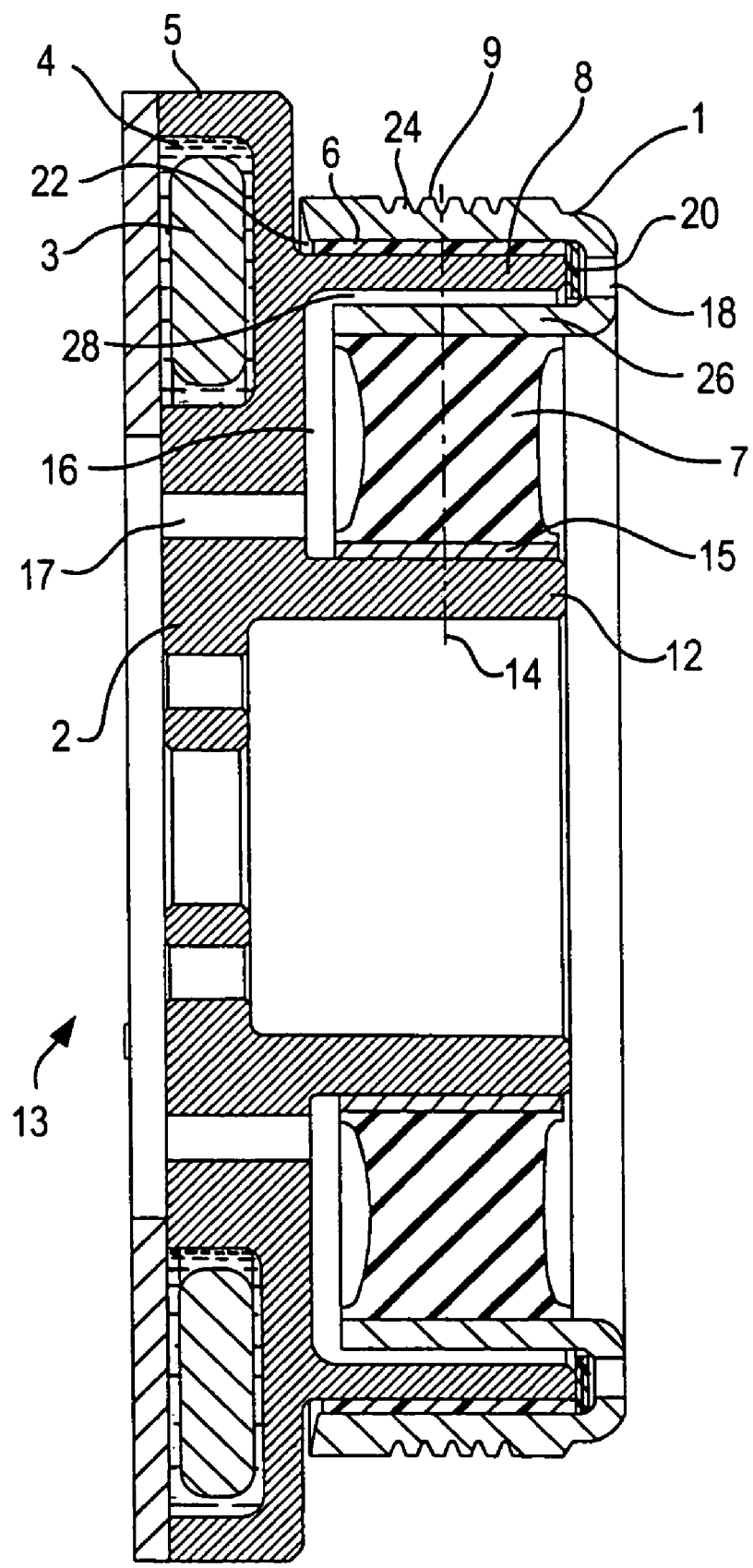

VIBRATION-DECOUPLED PULLEY HAVING AN INTEGRATED VISCO DAMPER

BACKGROUND OF THE INVENTION

The present invention relates to a pulley that is decoupled from the vibrations of a crankshaft and that has an integrated viscous torsional vibration damper, including a flywheel, which is arranged in a damper housing that is filled with a viscous medium and which can rotate relative to the housing, as well as a bearing and a coupling made of rubber elastic material, for supporting the pulley in relation to the damper housing in a flexible manner in the direction of the circumference of the pulley and so as to be capable of relative rotation, the pulley being arranged so as to be axially adjacent to the flywheel.

A visco damper in the context of the present invention is understood as a viscocity torsional vibration damper.

In this context, a pulley of this type is known from German Patent Application No. 197 08 082 A1. A hub and a separately produced damper housing, are fixedly connected to the crankshaft of an internal combustion engine, the damper housing, in FIGS. 1 and 3, being radially enclosed on the exterior side by a first belt-bearing surface of the pulley at a radial clearance, a sliding bearing being arranged in the gap formed by the clearance. The bearing contacts the external circumference of the damper housing and the internal circumference of the first belt-bearing surface, immediately adjacent. The coupling connects the hub to a second belt-bearing surface, which is assigned to the first belt-bearing surface so as to be one integrated piece, axially adjacent. In FIG. 2, the pulley is supported on the hub by a bearing, the elastic flexibility of the pulley in the circumferential direction with respect to the hub being effected by the coupling.

BRIEF SUMMARY OF THE INVENTION

The present invention is based on the objective of further developing a pulley of the type cited above, such that the bearing provided for the rotationally flexible support of the pulley, during normal use, is subjected to comparatively quite reduced temperatures and therefore has improved working properties during a significantly lengthened service life. In addition, the decoupled pulley has a simpler and more cost-effective design and is easier to assemble. Furthermore, the available installation space for the largest possible exterior diameter of the visco damper is not hemmed in by the pulley.

In the context of the present invention, it is provided for achieving the objective that the damper housing has at least one first axial projection, which is enclosed by the belt-bearing surface of the pulley at a radial clearance and that the bearing is arranged in the gap formed by the clearance. Pulleys having integrated torsional vibration dampers are generally provided, on the one hand, to decouple through vibration technology the belt drive of the auxiliary aggregates from the rotational irregularities of the crankshaft driving the auxiliary aggregates, and, on the other hand, to dampen the torsional vibrations of the crankshaft. The belt drive is decoupled, through vibration technology, as a result of the torsionally flexible coupling that is made of rubber elastic material, and the torsional vibrations of the crankshaft are dampened by the visco damper. In comparison to conventional vibration dampers, in which a flywheel surrounds a hub ring at a radial clearance, a spring member made of rubber elastic material being arranged in the gap formed by the clearance, visco dampers have the advantage of a greater working capacity. The flywheel of the viscous torsional vibration damper is arranged in the damper housing, where a viscous damping medium is situated within an annular gap between the flywheel and the damper housing. To dampen torsional vibrations, for example, of a crankshaft, the flywheel within the damper housing can rotate freely in the circumferential direction, a dampening effect being generated by the rotatability of flywheel and damper housing relative to each other and by the alternating shearing of the viscous medium within the annular gap. In this manner, mechanical energy is converted into heat, which can be removed via the damper housing surrounding the flywheel. In this context, temperatures of, for example, 110 degrees C. can arise on the surface of the damper housing. The axially adjacent arrangement of pulley and visco damper makes it possible to optimally exploit the available installation space with regard to the achievable support and damping characteristics.

The working capacity of the visco damper is substantially determined by the rotational mass of the flywheel. The greatest possible exterior diameter of the visco damper should therefore be the goal, if there is high torsional stressing. As a result of the embodiment according to the present invention, the available installation space of the visco damper is not hemmed in by the pulley.

In the configuration of the pulley in accordance with the present invention, it is advantageous that the visco damper is spatially separated from the pulley bearing so that, even in response to high thermal stressing of the visco damper, no undesirable increase in temperature is created in the bearing; the danger of attenuated working properties as a result of excessive bearing temperatures is kept to a minimum.

If the bearing encloses, for example, the exterior circumference of the damper housing, as in the above-mentioned related art, then the bearing has a temperature that essentially corresponds to the surface temperature of the damper housing. In contrast, in accordance with the present invention, as a result of the arrangement of the bearing on the first axial projection, a reduction of the bearing temperature by at least 15% is assured, in comparison to the surface temperature of the damper housing.

Other improved working properties are achieved as a result of the fact that the dimensioning of the visco damper is not influenced by the pulley. As a result, a significantly more effective visco damper can be configured, which achieves a significantly lower temperature level in comparison to the related art, it being possible to achieve a temperature reduction greater than 50%. In critical applications, the use of the visco damper is therefore made possible, since the maximum temperature stressing of the visco damper is limited.

The aforementioned arrangement has a special advantage if the bearing is an unlubricated sliding bearing, as is generally customary in these application cases.

The damper housing can be configured, for example, as a cast part. In this context, it is advantageous that the axial projection can be pre-molded without difficulty onto the damper housing and that, as a result of the manifold configuration possibilities of the vibration-decoupled pulley, component parts of this type can also be used in irregular installation spaces, which is of great importance.

It is also advantageous that by introducing appropriate openings in the housing and the pulley, it is possible to ventilate the interior space between the coupling and housing, thus enabling the bearing and damper to be cooled.

The first axial projection is preferably constituted as an integral component part of the damper housing. In this context, it is advantageous that the vibration-decoupled pulley overall has a simple design of few parts and that it is easy to assemble, which is important from the production-technical and economic points of view. As a result of the configuration of the axial projection being integrated in the damper housing, the radial position of the pulley with regard to the damper housing is always clearly stipulated.

Viewed in cross-section, the pulley can have an essentially C-shaped profile. On the basis of the profile that is axially open in the direction of the flywheel, the pulley surrounds the axial projection, the bearing with regard to the reduced mechanical stresses, preferably enclosing the first axial projection radially on the exterior side and supporting the interior circumferential surface of the belt-bearing surface. The mechanical stresses on the bearing are limited by its comparatively large diameter.

On the radial interior side, the torsionally flexible coupling made of rubber elastic material is preferably vulcanized on the radially interior leg of the C-shaped pulley. On the exterior circumference, the radially interior leg is assigned to the adjoining interior circumferential surface of the first axial projection at a radial clearance.

As a result of the configuration of the first axial projection integrated in the damper housing, it is possible to do without the more expensive, separate production of the damper housing and of the first axial projection as well as the subsequent process of joining them to each other.

The bearing is configured as a radial bearing, because the strand forces introduced by the belt-bearing surface are active basically in this direction.

For some application cases, it can be advantageous if the bearing is configured as a combined radial and axial bearing. The axial part of the bearing preferably extends in the radial direction within the C-shaped profile of the pulley between the interior circumferential surface of the belt-bearing surface and the exterior circumferential surface of the first axial projection. In a configuration of this type, it is advantageous that the axial bearing is arranged within the hollow space that is bordered by the pulley, and that the axial bearing is therefore well protected from impurities that could limit its service life. Only in response to an axial displacement of the pulley with respect to the first axial projection, is it possible that the axially adjacent surfaces of the axial bearing and the end face of the axial projection briefly contact each other.

The bearing is preferably configured as an unlubricated sliding bearing. In comparison to rolling bearings, sliding bearings have smaller dimensions, specifically in the radial direction, which is of significant advantage with regard to the difficult installation situations of the decoupled pulley.

The coupling on the side radially facing away from the pulley can be fixedly arranged on a second axial projection of the housing. In comparison to embodiments in which the interior circumference of the torsionally flexible coupling is supported, for example, on the exterior circumference of a hub, which is fixedly joined to the damper housing, the arrangement of the interior circumference of the coupling on the second axial projection of the damper housing is advantageous because only the pulley, together with the coupling, needs to be joined to the damper housing. A supplemental, separate assembly procedure for securing the interior circumference of the coupling on the surface of a hub is therefore not necessary.

An imaginary radial plane can intersect the belt-bearing surface, the bearing, the first axial projection, and the coupling, in each case, in basically an axially centered fashion. In this context, it is advantageous that the strand forces introduced via the belt-bearing surface do not exert any torque on the respective component parts. As a result of this advantageous arrangement, the wear on the individual parts is minimized, and the decoupled pulley has uniformly good working properties during a long service life.

BRIEF DESCRIPTION OF THE DRAWING

An exemplary embodiment of the present invention is further discussed below on the basis of the FIGURE.

DETAILED DESCRIPTION OF A PREFERRED EMBODIMENT

In the FIGURE, an exemplary embodiment of a vibration-decoupled pulley 1 having an integrated visco damper 2 is depicted.

In the exemplary embodiment depicted here, pulley 1, visco damper 2, bearing 6, and coupling 7 constitute a pre-assemblable unit 13.

The damper housing is executed as a cast part in the exemplary embodiments depicted here, damper housing 5 completely enclosing flywheel 3. The annular hollow space between the surface of flywheel 3 and the walls that border the hollow space of damper housing 5 is filled with viscous medium 4, for example, a silicon oil. Flywheel 3 can rotate freely relative to damper housing 5, the damping of torsional vibrations of the crankshaft being achieved by a shearing of viscous medium 4 in response to rotations of flywheel 3 relative to damper housing 5. The hollow space is closed to the outside by a cover that is secured on damper housing 5.

Coupling 7, which is made of a rubber elastic material, is provided in order to isolate irregularities in the rotation of the crankshaft from the belt drive of attached auxiliary aggregates.

For the support of pulley 1 on damper housing 5, the pulley being configured in this exemplary embodiment in a C-shaped profile with a first leg 24 and a second leg 26 defining the arms of the C-shaped profile, a bearing 6, 20 is provided, which is configured in this exemplary embodiment as an unlubricated sliding bearing. The bearing includes a radial bearing 6 and an axial bearing 20, the radial bearing 6, on the exterior circumference side, enclosing first axial projection 8, which is provided as an integral part of damper housing 5, and supporting pulley 1 at belt-bearing surface 9. Pulley 1, which is open on the flywheel side, encloses annular axial projection 8. To the outside of axial projection 8, the pulley 1 is radially supported on axial projection 8 by radial bearing 6 in an annular gap 22. To the inside, axial projection 8 radially borders an annular gap 28 at the outer surface of the second leg 26 of the pulley 1 that is facing the axial projection 8. The damper housing 5 has an opening 17 and the pulley 1 has an opening 18 for ventilating an interior space 16 of the pulley device.

On the interior circumferential side, coupling 7 is vulcanized using a ring 15, ring 15 being stamped onto a seat of second axial projection 12. Second axial projection 12, like first axial projection 8, is an integral component part of damper housing 5. Thus coupling 7 elastically couples damper housing 5 to pulley 1, permitting limited circumferential motion between the damper housing 5 and pulley 1 due to the elastic nature of coupling 7.

An imaginary radial plane 14 intersects belt-bearing surface 9, bearing 6, first axial projection 8, and coupling 7, in each case, essentially in the axial center. As a result of the reciprocal assignment of the aforementioned component parts, the center of gravity of the respective parts lying essentially on imaginary radial plane 14, the torques affecting the component parts are kept to a minimum.

What is claimed is:

1. A pulley device comprising:
    a pulley decoupled from vibrations of a crankshaft and having a belt bearing surface;
    an integrated viscous torsional vibration damper having a damper housing and a flywheel, the flywheel being arranged in the damper housing filled with a viscous medium and being rotatable relative to the damper housing, the pulley axially adjoining the flywheel;
    a bearing; and
    a coupling made of rubber elastic material for supporting the pulley with respect to the damper housing in a flexible manner in a circumferential direction of the pulley; the damper housing having an integrally-formed first axial projection projecting axially with respect to the flywheel and enclosed by the belt-bearing surface of the pulley at a radial clearance so as to define a gap, the bearing being arranged in the gap.

2. The pulley device as recited in claim 1 wherein the damper housing with the integrally-formed first axial projection is a cast-part.

3. The pulley device as recited in claim 1 wherein the damper housing has a second axial projection radially inside the first axial projection, and a first opening between the first and second axial projections.

4. The pulley device as recited in claim 3 wherein the pulley has a first leg contacting the bearing and a second leg located between the first and second axial projections.

5. pulley device as recited in claim 4 wherein the pulley has a second opening.

6. A pulley device comprising:
    a pulley decoupled from vibrations of a crankshaft and having a belt bearing surface;
    an integrated viscous torsional vibration damper having a damper housing and a flywheel, the flywheel being arranged in the damper housing filled with a viscous medium and being rotatable relative to the damper housing, the pulley axially adjoining the flywheel;
    a bearing; and
    a coupling made of rubber elastic material for supporting the pulley with respect to the damper housing in a flexible manner in a circumferential direction of the pulley;
    the damper housing having a first axial projection projecting axially with respect to the flywheel, the first axial projection enclosed by the belt-bearing surface of the pulley at a radial clearance so as to define a gap, the bearing being arranged in the gap, the damper housing having a second axial projection, the coupling connecting the second axial projection to the pulley.

7. The pulley device as recited in claim 6 wherein the first axial projection is integral with the damper housing.

8. The pulley device as recited in claim 6 wherein the pulley viewed in cross-section has a C-shaped profile.

9. The pulley device as recited in claim 8 wherein the first axial projection fits between two legs of the C-shaped profile.

10. The pulley device as recited in claim 6 wherein the bearing comprises a radial bearing.

11. The pulley device as recited in claim 6 wherein the bearing is a combined radial and axial bearing.

12. The pulley device as recited in claim 6 wherein the bearing is an unlubricated sliding bearing.

13. The pulley device as recited in claim 6 wherein the pulley is C-shaped and has a first leg contacting the bearing and a second leg connected elastically via the coupling to the second axial projection of the damper housing.

14. The pulley device as recited in claim 13 wherein the first axial projection and the second leg are separated by a second gap.

15. The pulley device as recited in claim 6 wherein the coupling, on a side radially facing away from the pulley, is connected elastically to the second axial projection.

16. The pulley device as recited in claim 6 wherein the belt-bearing surface, the bearing, the first axial projection, and the coupling are concentric with regard to each other.

17. The pulley device as recited in claim 16 wherein the belt-bearing surface, the bearing, the first axial projection, and the coupling overlap axially.

18. The pulley device as recited in claim 6 wherein the damper housing has at least one opening and the pulley has at least one other opening for ventilating an interior space of the pulley device.

19. The pulley device as recited in claim 6 wherein the second axial projection is radially inside the first axial projection, and the damper housing has a first opening between the first and second axial projections.

20. A pulley device comprising:
    a pulley decoupled from vibrations of a crankshaft and having a belt bearing surface;
    an integrated viscous torsional vibration damper having a damper housing and a flywheel, the flywheel being arranged in the damper housing filled with a viscous medium and being rotatable relative to the damper housing, the pulley axially adjoining the flywheel;
    a bearing; and
    a coupling made of rubber elastic material for supporting the pulley with respect to the damper housing in a flexible manner in a circumferential direction of the pulley;
    the damper housing having at least one first axial projection enclosed by the belt-bearing surface of the pulley at a radial clearance so as to define a gap, the bearing being arranged in the gap,
    the pulley defining a first side of the pulley device, and the torsional vibration damper defining a second side of the pulley device, the damper housing having a first hole, and the pulley device having a second hole.

* * * * *